(12) United States Patent
Lee (10) Patent No.: US 8,736,749 B2
(45) Date of Patent: May 27, 2014

(54) PHOTOGRAPHING METHOD AND PHOTOGRAPHING APPARATUS HAVING HYBRID FOCAL PLANE SHUTTER

(75) Inventor: Myung-hun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 13/616,329

(22) Filed: Sep. 14, 2012

(65) Prior Publication Data

US 2013/0208170 A1 Aug. 15, 2013

(30) Foreign Application Priority Data

Feb. 15, 2012 (KR) .......................... 10-2012-0015533

(51) Int. Cl.
*H04N 5/238* (2006.01)
*G03B 9/08* (2006.01)

(52) U.S. Cl.
USPC ............................ 348/363; 348/367; 396/456

(58) Field of Classification Search
CPC .......... H04N 5/2254; G03B 9/08; G03B 9/10; G03B 9/18
USPC .......... 348/362–363, 367; 396/449, 452–456, 396/471, 484–487
See application file for complete search history.

(56) References Cited

U.S. PATENT DOCUMENTS

| 7,742,097 | B2 * | 6/2010 | Noto .............................. 348/335 |
| 2002/0025167 | A1 | 2/2002 | Toyoda |
| 2003/0161624 | A1 | 8/2003 | Toyoda |
| 2005/0110894 | A1 | 5/2005 | Hiramatsu |
| 2006/0087573 | A1 | 4/2006 | Harada |
| 2006/0098115 | A1 * | 5/2006 | Toyoda ......................... 348/362 |
| 2007/0285551 | A1 * | 12/2007 | Noto .............................. 348/335 |
| 2008/0138059 | A1 | 6/2008 | Julian et al. |
| 2008/0259200 | A1 * | 10/2008 | Matsumoto ................... 348/340 |
| 2008/0291306 | A1 * | 11/2008 | Totori ........................... 348/296 |
| 2009/0015704 | A1 | 1/2009 | Namai et al. |
| 2011/0129212 | A1 | 6/2011 | Yamaguchi et al. |
| 2012/0229698 | A1 * | 9/2012 | Tsubono ....................... 348/363 |

FOREIGN PATENT DOCUMENTS

| JP | 2005-159418 A | 6/2005 |
| JP | 2006-101492 A | 4/2006 |
| JP | 2007-053742 A | 3/2007 |
| JP | 2011-124944 A | 6/2011 |

OTHER PUBLICATIONS

Search Report established for EP 12187181.8 (Jul. 12, 2013).

* cited by examiner

*Primary Examiner* — Kelly L Jerabek
(74) *Attorney, Agent, or Firm* — Drinker Biddle & Reath LLP (57) ABSTRACT

A photographing apparatus includes: an image capturing unit; a first blade making a first movement to move to the other side edge of the image capturing unit and a second movement to move to a side edge of the image capturing unit; a second blade moving along with the first blade to the other side edge while being spaced apart from the first blade during the first movement and moving to the side edge of the image capturing unit during the second movement; a third blade moving along with the first blade to the side edge of the image capturing unit to block light from the image capturing unit and then moving to the other side edge to open the image capturing unit; and a controlling unit that resets the plurality of pixels in the rows of the image capturing unit corresponding to the first blade during the first movement.

20 Claims, 8 Drawing Sheets

FIG. 9
(Conventional Focal Plane Shutter)

FIG. 10

PHOTOGRAPHING METHOD AND PHOTOGRAPHING APPARATUS HAVING HYBRID FOCAL PLANE SHUTTER

CROSS-REFERENCE TO RELATED PATENT APPLICATION

This application claims the priority benefit of Korean Patent Application No. 10-2012-0015533, filed on Feb. 15, 2012, in the Korean Intellectual Property Office, the disclosure of which is incorporated herein in its entirety by reference.

BACKGROUND

Various embodiments relate to a photographing method and a photographing apparatus having a hybrid focal plane shutter, and more particularly, to a photographing method and a photographing apparatus, wherein a hybrid focal plane shutter employing a mechanical shutter and an electronic shutter is used, and a time delay caused by an operation of the hybrid focal plane shutter is minimized so as to perform photographing quickly.

A focal plane shutter is a type of a photographing shutter disposed on a focal plane of a photographing apparatus, i.e., disposed in front of a photographing device of a digital camera or a film of a film camera.

Japanese Patent Application Publication No. 2011-124944 discloses a technology relating to a photographing apparatus using a focal plane shutter that combines a mechanical shutter and an electronic shutter. According to Japanese Patent Application Publication No. 2011-124944, a time difference from a time when a shutter release (start of a photographing operation) is generated and a time when exposure starts is reduced by combining the mechanical shutter and the electronic shutter. However, since all signals generated by an image capturing unit should be read before the mechanical shutter is returned to its original position, a time delay occurs when a continuous shooting function (a continuous photographing function) for continuously performing photographing is executed.

SUMMARY

Various embodiments provide a photographing method and a photographing apparatus, whereby a time required for an operation of a focal plane shutter may be reduced so as to reduce a photographing time.

The various embodiments also provide a photographing apparatus having a hybrid focal plane shutter that combines a mechanical shutter and an electronic shutter, and a photographing method using the photographing apparatus.

The embodiments also provide a photographing method and a photographing apparatus, whereby time required for continuous shooting photographing may be reduced.

According to an embodiment, there is provided a photographing apparatus including: an image capturing unit including a plurality of pixels arranged in rows and columns, wherein the image capturing unit converts light into an electrical signal; a first blade having a length smaller than a length in a column direction of the image capturing unit, wherein the first blade makes a first movement to move from a side edge of the image capturing unit to an other side edge of the image capturing unit, and makes a second movement to move from the other side edge of the image capturing unit to the side edge of the image capturing unit; a second blade that is movable between a position in which the second blade moves to the side edge of the image capturing unit and a position in which the second blade covers the image capturing unit, wherein the second blade moves along with the first blade in a state where the second blade is spaced apart from the first blade by a predetermined distance when the first blade makes the first movement, and moves to the side edge of the image capturing unit together with the first blade when the first blade makes the second movement; a third blade that is movable between a position in which the third blade moves to the other side edge of the image capturing unit, wherein the third blade blocks light incident on the image capturing unit by moving along with the first blade, and moves to the other side edge of the image capturing unit to open the image capturing unit; and a controlling unit that resets the plurality of pixels in the rows of the image capturing unit when the plurality of pixels is in a position of the image capturing unit corresponding to the first blade while the first blade makes the first movement.

The second blade may include a plurality of first layers that overlap each other in a position in which the second blade moves to the side edge of the image capturing unit, and the plurality of first layers of the second blade may be unfolded to cover the image capturing unit while the second blade moves to the position in which the second blade covers the image capturing unit.

The third blade may include a plurality of second layers that overlap each other in a position in which the third blade moves to the other side edge of the image capturing unit, and the plurality of second layers of the third blade may be unfolded to cover the image capturing unit while the third blade moves to the position in which the third blade covers the image capturing unit.

When the first blade makes the second movement, the third blade may be connected to the first blade and may move together with the first blade.

The photographing apparatus may further include an elastic member that elastically connects the third blade to a main body of the photographing apparatus.

The first blade may include a connection portion that connects to the third blade, and the third blade may include a support portion that supports the connection portion of the first blade. The connection portion of the first blade may have a pin shape and may protrude towards an outside of the first blade, and the support portion of the third blade may include an accommodation groove formed in the third blade to accommodate the connection portion, and a support pin disposed to be movable in the accommodation groove so that the support pin opens the accommodation groove to allow the connection portion to pass through the accommodation groove or closes the accommodation groove to support the connection portion inserted in the accommodation groove.

According to embodiment, there is provided a photographing method whereby light is converted into an electrical signal by using an image capturing unit including a plurality of pixels arranged in rows and columns, the photographing method including: moving a first blade having a length smaller than a length in a column direction of the image capturing unit from a side edge of the image capturing unit to an other side edge of the image capturing unit; moving a second blade along with the first blade in a state where the second blade is spaced apart from the first blade by a predetermined distance; resetting the plurality of pixels in the rows of the image capturing unit when the plurality of pixels is in a position of the image capturing unit corresponding to the first blade while the first blade moves; and converting light incident on the image capturing unit into an electrical signal through a space between the first blade and the second blade while the first blade moves; reading an electrical signal output from the pixels in which light is received by the image capturing unit; moving the first blade and the second blade from the other side of the image capturing unit to the side edge of the image capturing unit while the electrical signal output from the pixels is read from all of the rows of the image capturing unit, after the first blade moves to the other side edge of the image capturing unit; and moving a third blade disposed at the other side edge of the image capturing unit to the side edge of the image capturing unit while the first blade and the second blade move to the side edge of the image capturing unit.

The photographing method may further include, after the reading of the electrical signal output from the plurality of pixels from all of the rows of the image capturing unit, moving the third blade to the other side edge of the image capturing unit to open the image capturing unit.

The third blade may be pressed to the other side edge of the image capturing unit using an elastic member.

The second blade may include a plurality of first layers that overlap each other in a position in which the second blade moves to the side edge of the image capturing unit, and the plurality of first layers of the second blade may be unfolded to cover the image capturing unit when the second blade moves along with the first blade toward the other side edge of the image capturing unit.

The third blade may include a plurality of second layers that overlap each other in a position in which the third blade moves to the other side edge of the image capturing unit, and the plurality of second layers of the third blade may be unfolded to cover the image capturing unit when the third blade moves to the side edge of the image capturing unit.

When the third blade is moving to the side edge of the image capturing unit, the third blade may be connected to the first blade and may move together with the first blade.

According to another embodiment, there is provided a photographing apparatus including: an image capturing unit that converts light into an electrical signal; a first blade that is movable between a first position corresponding to a side edge of the image capturing unit and a second position corresponding to an other side edge of the image capturing unit; a second blade disposed in the first position including a plurality of first layers that is movable to overlap or to be unfolded, wherein when the first blade moves to the second position, the second blade moves along with the first blade while maintaining a predetermined distance apart from the first blade and the plurality of first layers unfolds to cover the image capturing unit, and when the first blade moves the first position, the second blade moves together with the first blade; a third blade disposed in the second position including a plurality of second layers to overlap or to be unfolded, wherein when the first blade moves from the second position to the first position, the third blade may be connected to the first blade and moves together with the first blade to the first position and then moves to the second position; and a controlling unit that resets a plurality of pixels in rows of the image capturing unit when the plurality of pixels is in a position of the image capturing unit corresponding to the first blade while the first blade moves to the second position.

While the first blade moves to the second position, the image capturing unit may convert light incident on the image capturing unit through a space between the first blade and the second blade to output the electrical signal, and while the controlling unit reads the electrical signal output from the image capturing unit, the first blade, the second blade, and the third blade may move to the first position and block light, and after the controlling unit reads the electrical signal from all of the rows of the image capturing unit, the third blade may move to the second position.

The photographing apparatus may further include an elastic member that elastically connects the third blade to a main body of the photographing apparatus.

The first blade may include a connection portion that connects to the third blade, and the third blade may include a support portion that supports the connection portion of the first blade. The connection portion of the first blade may have a pin shape and may protrude towards an outside of the first blade, and the support portion of the third blade may include an accommodation groove formed in the third blade to accommodate the connection portion, and a support pin disposed to be movable in the accommodation groove so that the support pin opens the accommodation groove to allow the connection portion to pass through the accommodation groove or closes the accommodation groove to support the connection portion inserted in the accommodation groove.

The photographing apparatus may further include a driving unit that operates in response to a control signal applied by the controlling unit to drive the support pin.

The photographing apparatus may further include a magnetic member that presses the third blade towards a main body of the photographing apparatus.

BRIEF DESCRIPTION OF THE DRAWINGS

The above and other features and advantages will become more apparent by describing in detail exemplary embodiments thereof with reference to the attached drawings in which.

DETAILED DESCRIPTION

Various embodiments will now be described more fully with reference to the accompanying drawings, in which exemplary embodiments of the invention are shown.

Figure 1:
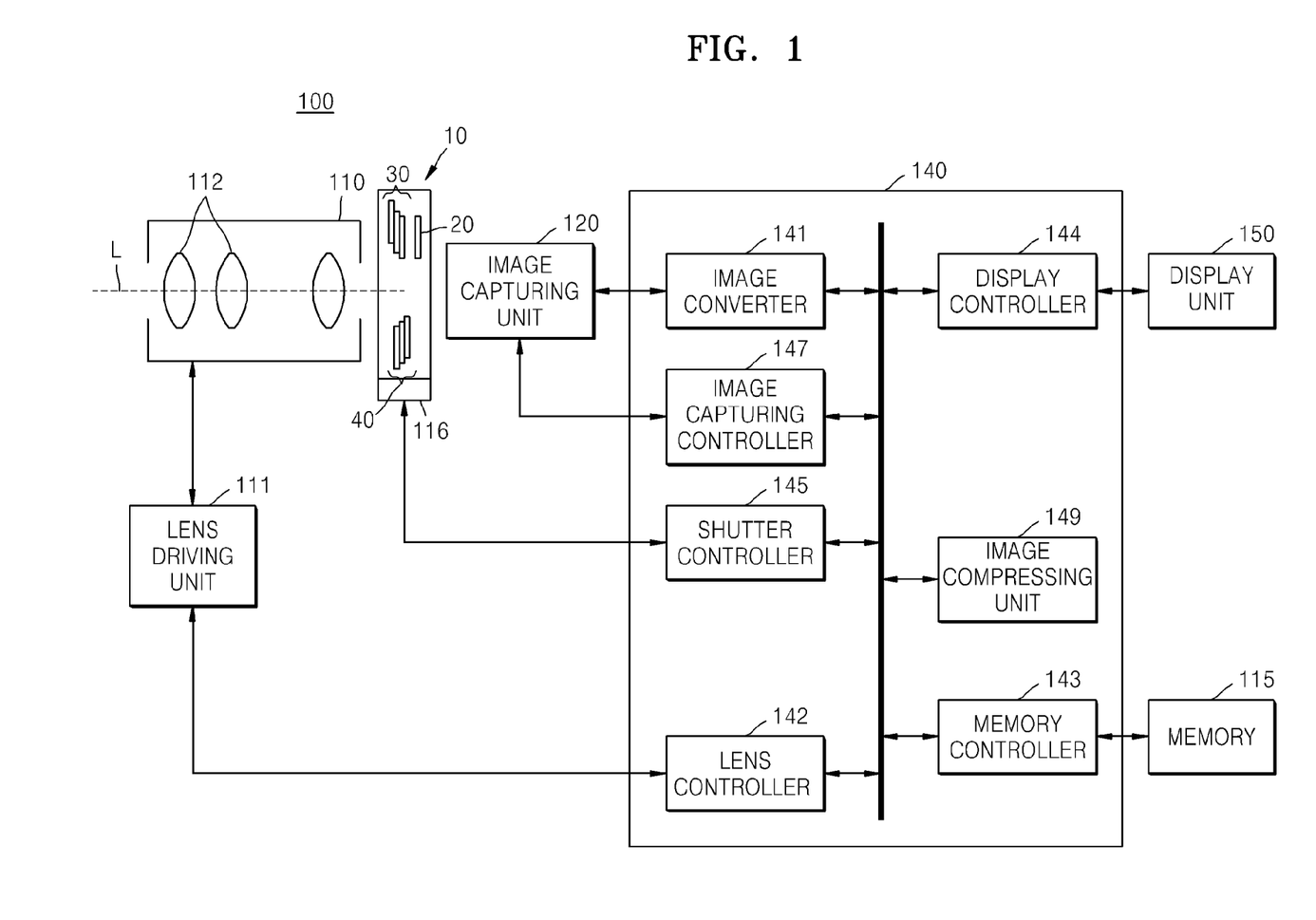
FIG. 1 is a schematic block diagram illustrating elements of a photographing apparatus, according to an embodiment.

FIG. 1 is a schematic block diagram illustrating elements of a photographing apparatus 100, according to an embodiment.

Referring to FIG. 1, the photographing apparatus 100 according to the present embodiment includes an image capturing unit 120, a focal plane shutter 10 including a first blade 20, a second blade 30, and a third blade 40, and a controlling unit 140 that controls the focal plane shutter 10.

Figure 2:
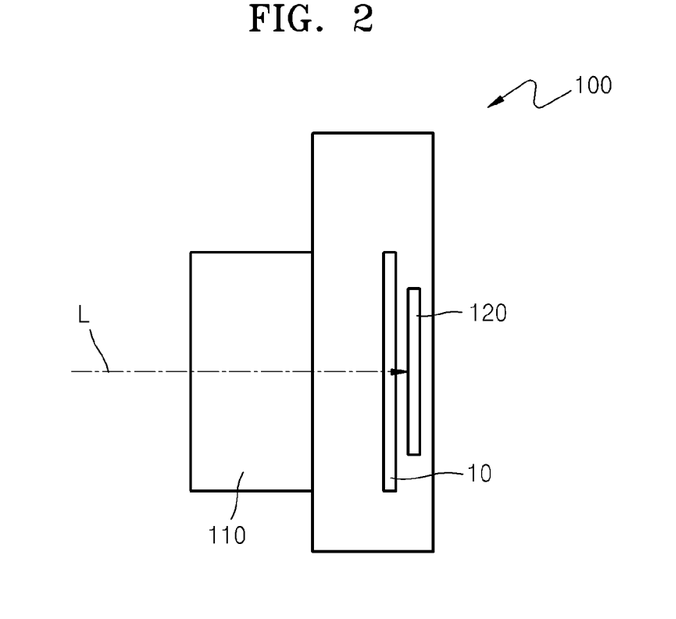
FIG. 2 is a conceptual diagram schematically illustrating some elements of the photographing apparatus illustrated in FIG. 1.

FIG. 2 is a conceptual diagram schematically illustrating some elements of the photographing apparatus illustrated in FIG. 1.

Referring to FIG. 2, the photographing apparatus 100 includes the image capturing unit 120 disposed on a light path L along which light passes through a lens barrel 110, and a focal plane shutter 10 disposed in front of the image capturing unit 120. The focal plane shutter 10 allows the light passing through the lens barrel 110 to pass through the image capturing unit 120, thereby performing an exposure operation for photographing an image.

The present embodiment is not limited to the configuration of the photographing apparatus 100 of FIG. 2.

Figure 3:
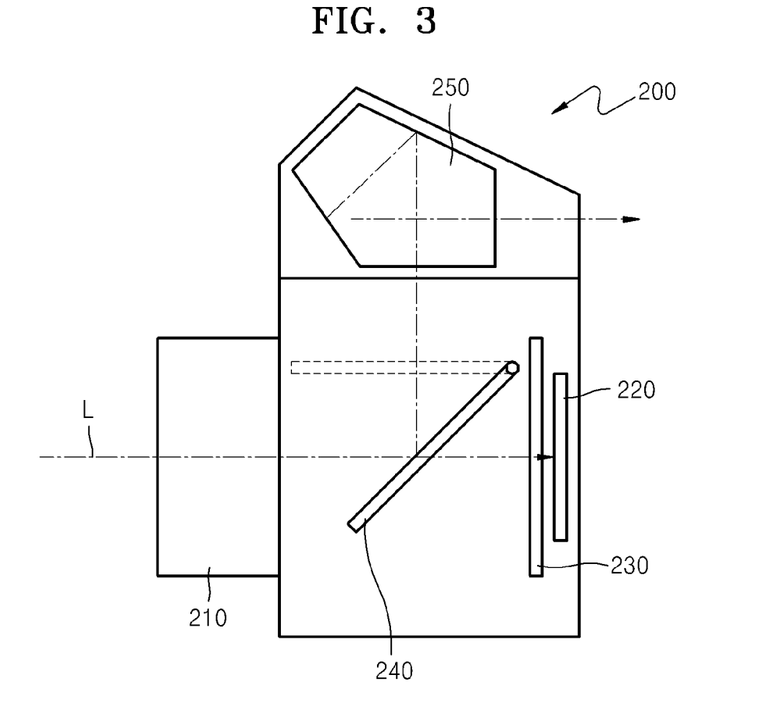
FIG. 3 is a conceptual diagram schematically illustrating some elements of a photographing apparatus, according to another embodiment.

FIG. 3 is a conceptual diagram schematically illustrating some elements of a photographing apparatus 200, according to another embodiment.

Referring to FIG. 3, the photographing apparatus 200 according to the present embodiment includes an image capturing unit 220 disposed on a light path L of light passing through a lens barrel 210 and a focal plane shutter 230 disposed in front of the image capturing unit 220. A rotatable mirror 240 is disposed between the focal plane shutter 230 and the lens barrel 210. When the mirror 240 is disposed in a position corresponding to a solid line of FIG. 3, an image of a subject is transferred to a pentaprism 250 via the mirror 240 and is embodied as a view finder image. When the mirror 240 is rotated to a position corresponding to a dotted line of FIG. 3, the image of the subject may be transferred to the image capturing unit 220 via the focal plane shutter 230.

The connection relationship between elements of the photographing apparatus 100 and an operation of the photographing apparatus 100 will now be described with reference to FIG. 1. The image capturing unit 120 captures the image of the subject to convert the captured image into an electrical signal. The electrical signal generated by the image capturing unit 120 is converted into image data by using an image converter 141. An image capturing controller 147 of the controlling unit 140 controls the image capturing unit 120 to perform an image capturing operation. The electrical signal output by the image capturing unit 120 may be read by the image converter 141 or may be modified by the image capturing unit 120 so that the electrical signal output may be processed into image data representing an image, and the image data may be transferred to the image converter 141.

The lens barrel 110 including a plurality of lenses 112 is disposed in front of the image capturing unit 120 and functions as an optical system for forming an image on a surface of the image capturing unit 120.

The focal plane shutter 10 disposed in front of the image capturing unit 120 includes the first blade 20, the second blade 30, and the third blade 40, which are driven by a shutter driving unit 116 and may move in front of the image capturing unit 120 in a vertical direction of the image capturing unit 120. The focal plane shutter 10 performs an exposure function to allow light passing through the lens barrel 110 to pass through the image capturing unit 120. The shutter driving unit 116 operates in response to a control signal applied by a shutter controller 145 of the controlling unit 140.

In order to move the first blade 20, the second blade 30, and the third blade 40 in the vertical direction of the image capturing unit 120, a mechanical assembly including elements such as a cam, a gear train, and the like may be used, and a driving force may be generated by an electrical motor or a ultrasonic wave motor for introducing ultrasonic vibration.

Lenses 112 are disposed in such a way that distances therebetween may vary. When the distances between the lenses 112 vary, a zooming rate, focus, or the like may be adjusted. The lenses 112 are disposed on an optical axis L. The optical axis L refers to a virtual straight line connecting optical centers of the lenses 112.

The lenses 112 are driven by a lens driving unit 111 having a driving unit, such as a zoom motor (not shown), so that their positions may vary. The lenses 112 may include a zoom lens to enlarge or reduce the size of the subject, and a focus lens that adjusts a focus of the subject.

The lens driving unit 111 operates in response to a control signal applied by the lens controller 142 of the controlling unit 140 and controls positions of the lenses 112 so that the lenses 112 may be positioned to have one of a plurality of enlargement magnifications.

The image capturing unit 120 includes a photoelectric conversion device, such as a charge-coupled device (CCD) or a complementary metal oxide semiconductor (CMOS), and converts image light incident through the lenses 112 and the focal plane shutter 10 into an electrical signal. The image capturing unit 120 is driven in response to a control signal applied by the image capturing controller 147.

The image converter 141 converts the electrical signal of the image capturing unit 120 into image data, thereby performing image processing or storing the image data in a storage medium, such as memory 115. For example, after converting the electrical signal of the image capturing unit 120 into red, green, and blue (RGB) data, the image converter 141 may convert the RGB data into raw data, such as a YUV signal including a brightness Y signal and a chrominance UV signal.

In addition, an operation of converting the electrical signal of the image capturing unit 120 by using the image converter 141 may include reducing driving noise of the image capturing unit 120 included in the electrical signal by using a correlation double sampling (CDS) circuit; controlling a gain of the electrical signal after noise reduction by using an automatic gain control (AGC) circuit; converting an analog signal into a digital signal by using an analog-to-digital (A/D) converter; and performing signal processing, such as pixel defect correction, gain correction, white balance correction, gamma correction, or the like, of the digital signal. The CDS circuit, the AGC circuit, or the A/D converter described above may be configured in an additional circuit.

The controlling unit 140 is electrically connected to the image capturing unit 120, the lens driving unit 111, the shutter driving unit 116, a display unit 150, and the memory 115 and exchanges control signals with the elements so as to control operations of each element, or performs a data processing function, or the like.

The controlling unit 140 includes the image converter 141, the lens controller 142, a memory controller 143, a display controller 144, the shutter controller 145, the image capturing controller 147, and an image compressing unit 149.

The controlling unit 140 may be implemented as a micro-chip, or a circuit board including a micro-chip. The elements of the controlling unit 140 may be implemented by software or circuits embedded in the controlling unit 140.

The memory controller 143 controls the memory 115 to record data on the memory 115 or to read recorded data or setting information from the memory 115.

The memory 115 may be volatile embedded memory, for example, a semiconductor memory device, such as a synchronous dynamic random access memory (DRAM)(SDRAM), or the like. The memory 115 may perform a buffer memory function of storing image data generated by the image converter 141 temporarily and a work memory function used in data processing.

In addition, the memory 115 may be a non-volatile external memory, for example, a memory stick, flash memory, such as a secure digital/multimedia card (SD/MMC), a storage device, such as a hard disk drive (HDD), or an optical storage device, such as digital versatile disk (DVD) or a compact disk (CD). In this case, image data that is compressed by the image compressing unit 149 in a format such as a JPEG file, a TIF file, a GIF file, a PCX file, or the like may be stored in the memory 115.

The photographing apparatus 100 may include the display unit 150 that displays an image of image data. The display unit 150 may be implemented as a touch screen that senses touch on a surface of the touch screen by using a display device, such as a liquid crystal display (LCD) or an organic light-emitting device and generates a signal corresponding to a sensed position.

Figure 4:
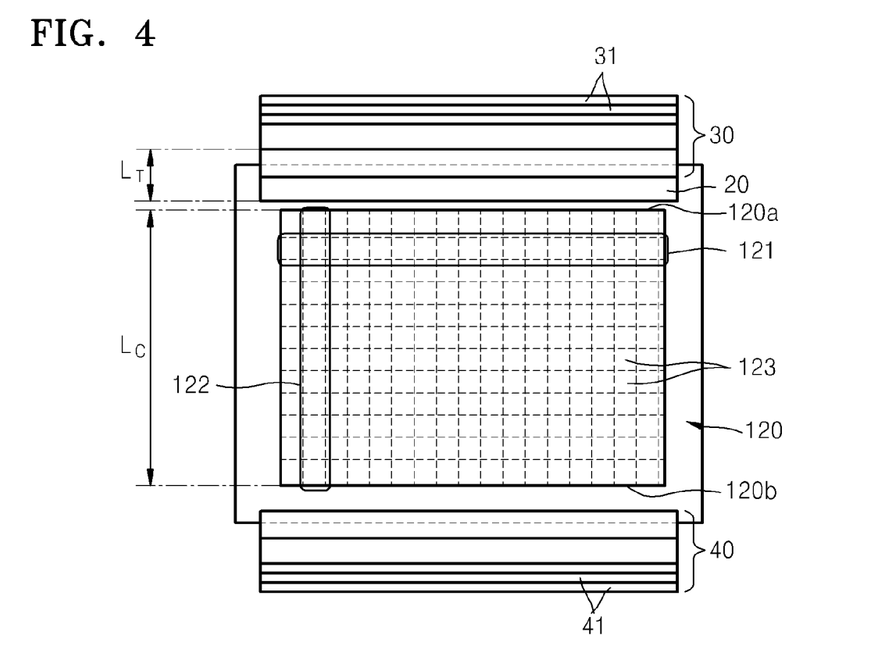
FIG. 4 is a front view illustrating a focal plane shutter to be mounted on the photographing apparatus of FIG. 1.
Figure 5:
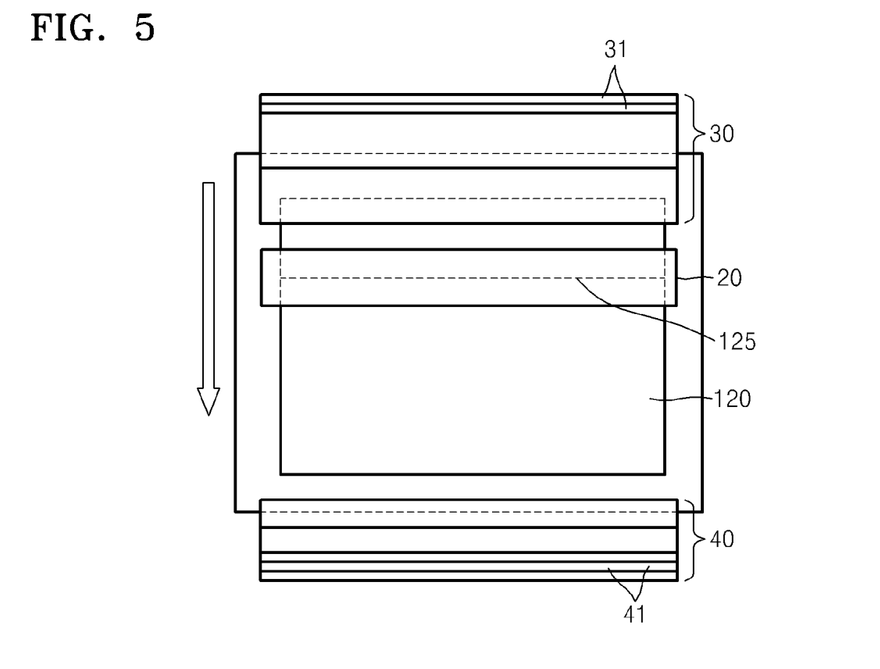
FIG. 5 is a front view illustrating an operating state of the focal plane shutter illustrated in FIG. 4.

FIG. 4 is a front view illustrating a focal plane shutter to be mounted on the photographing apparatus 100 of FIG. 1, and FIG. 5 is a front view illustrating an operating state of the focal plane shutter illustrated in FIG. 4.

The image capturing unit 120 includes a plurality of pixels 123 arranged in rows 121 and columns 122 and performs a function of converting light into an electrical signal.

The first blade 20 is disposed in front of the image capturing unit 120 to be movable in a vertical direction of the image capturing unit 120. The first blade 20 has a length $L_T$ smaller than a length $L_C$ in a column direction of the image capturing unit 120. The first blade 20 may move from a first position where the first blade 20 is disposed at a side edge 120a of the image capturing unit 120 to a second position where the first blade 20 is disposed at the other side edge 120b of the image capturing unit 120, or may move to the first position from the second position.

In addition, the second blade 30 is disposed in front of the image capturing unit 120 to be movable in the vertical direction of the image capturing unit 120. The second blade 30 includes a plurality of first layers 31 disposed to overlap or to be unfolded. The second blade 30 may be movable between a position where the second blade 30 moves to the side edge 120a of the image capturing unit 120 and a position where the second blade 30 moves in a downward direction of the image capturing unit 120 to cover the image capturing unit 120.

When the second blade 30 moves to the one side edge 120a of the image capturing unit 120, the plurality of first layers 31 of the second blade 30 overlap each other, as illustrated in FIG. 4. When the second blade 30 moves to the other side edge 120b of the image capturing unit 120, the first layers 31 of the second blade 30 are unfolded and cover the image capturing unit 120, thereby blocking light.

A movement of the first blade 20 to the other side edge 120b from the side edge 120a of the image capturing unit 120 is referred to as a first movement, and a movement of the first blade 20 to the side edge 120a from the other side edge 120b of the image capturing unit 120 is referred to as a second movement.

During the first movement of the first blade 20, the second blade 30 moves to the other side edge 120b of the image capturing unit 120 along the first blade 20 in a state where the second blade 30 is spaced apart from the first blade 20 by a predetermined distance.

After the first blade 20 completes the first movement, the first blade 20 may perform the second movement in which the first blade 20 moves to the side edge 120a from the other side edge 120b of the image capturing unit 120. The second blade 30 moves to the side edge 120a of the image capturing unit 120 together with the first blade 20 when the first blade 20 makes second movement.

An electronic front curtain 125 may operate during the first movement of the first blade 20. The operation of the electronic front curtain 125 is implemented by an operation of resetting pixels arranged in the rows 121 of the image capturing unit 120, when the pixels are in a position of the image capturing unit 120 corresponding to the first blade 20 while the first blade 20 makes the first movement.

A control signal is applied by the image capturing controller 147 of FIG. 1 to the image capturing unit 120 so that the image capturing unit 120 may drive the electronic front curtain 125. The electronic front curtain 125, in which the pixels arranged in the rows 121 of the image capturing unit 120 are reset, operates sequentially in the rows 121 of the image capturing unit 120 from the side edge 120a of the image capturing unit 120 to the other side edge 120b of the image capturing unit 120 while the first blade 20 makes the first movement.

In addition, the third blade 40 is disposed in front of the image capturing unit 120 to be movable in the vertical direction of the image capturing unit 120. The third blade 40 includes a plurality of second layers 41 disposed to overlap or to be unfolded. The third blade 40 may be movable between a position in which the third blade 40 moves to the other side edge 120b of the image capturing unit 120 and a position in which the third blade 40 moves in an upward direction of the image capturing unit 120 to cover the image capturing unit 120.

When the third blade 40 moves to the other side edge 120b of the image capturing unit 120, the plurality of second layers 41 of the third blade 40 overlap each other, as illustrated in FIG. 4. When the third blade 40 moves to the side edge 120a of the image capturing unit, the second layers 41 of the third blade 40 are unfolded and cover the image capturing unit 120, thereby blocking light incident on the image capturing unit 120.

When the first blade 20 makes the second movement after completing the first movement, the third blade 40 may move to the other side edge 120b of the image capturing unit 120 along with the first blade 20. While the third blade 40 moves along with the first blade 20 that makes the second movement, the second layers 41 of the third blade 40 are unfolded, thereby blocking light incident on the image capturing unit 120.

After the first blade 20 moves to the side edge 120a of the image capturing unit 120 by making the second movement, the third blade 40 may move to the other side edge 120b of the image capturing unit 120, thereby opening the image capturing unit 120.

The present embodiment is not limited to a configuration in which the first blade 20, the second blade 30, and the third blade 40 are disposed to move in the vertical direction of the image capturing unit 120. By modifying the present embodiment, the first blade 20, the second blade 30, and the third blade 40 may move in a horizontal direction of the image capturing unit 120.

Figure 6:
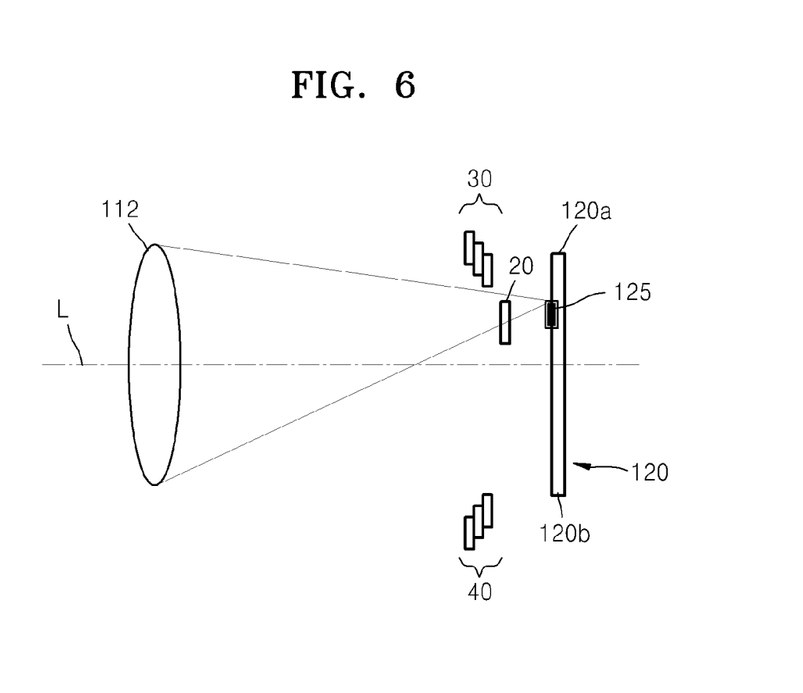
FIG. 6 is a conceptual diagram schematically illustrating some elements of the photographing apparatus of FIG. 1, in order to represent an operating state of the photographing apparatus of FIG. 1.

FIG. 6 is a conceptual diagram schematically illustrating some elements of the photographing apparatus of FIG. 1, in order to represent an operating state of the photographing apparatus of FIG. 1.

Light that passes through the lenses 112 proceeds towards the image capturing unit 120. Depending on the positions of the first blade 20, the second blade 30, and the third blade 40 that are movably disposed in front of the image capturing unit 120, the light may be incident on the image capturing unit 120, or the light incident on the image capturing unit 120 may be blocked.

While the first blade 20 makes the first movement to move to the other side edge 120b from the side edge 120a of the image capturing unit 120, the electronic front curtain 125, in which the pixels in the rows 121 of the image capturing unit 120 corresponding to the first blade 20 are reset, operates, so that exposure may be performed on the light that is incident on the image capturing unit 120 through a space between the first blade 20 and the second blade 30.

Figure 7:
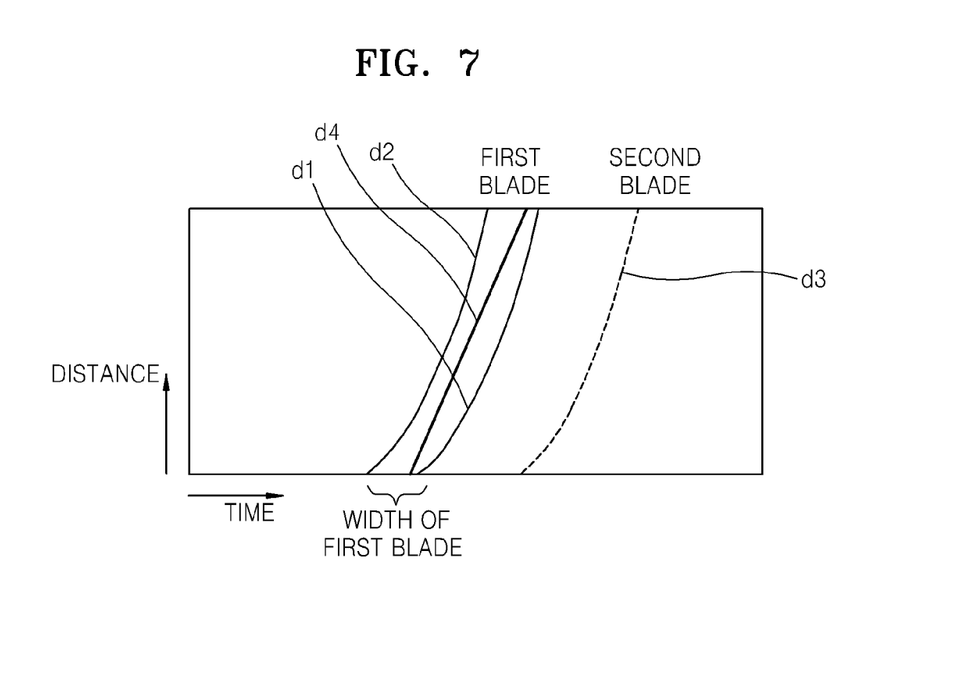
FIG. 7 is a graph illustrating an operation of the focal plane shutter of the photographing apparatus illustrated in FIG. 6.

FIG. 7 is a graph illustrating an operation of the focal plane shutter 10 of the photographing apparatus illustrated in FIG. 6.

Referring to FIG. 7, the horizontal axis represents a change in time when the focal plane shutter 10 of FIG. 1 operates, and the vertical axis represents a change in a movement distance of each of the first blade 20, the second blade 30, and the electronic front curtain 125 of the focal plane shutter 10 relative to the image capturing unit 120.

A first curve d1 and a second curve d2 respectively represent a change in a movement distance of both edges of the first blade 20 in the vertical direction of the first blade 20, and a third curve d3 represents a movement distance of a lower edge of the second blade 30 facing the first blade 20. In addition, a fourth curve d4 represents speed of the electronic front curtain 125.

Figure 8:
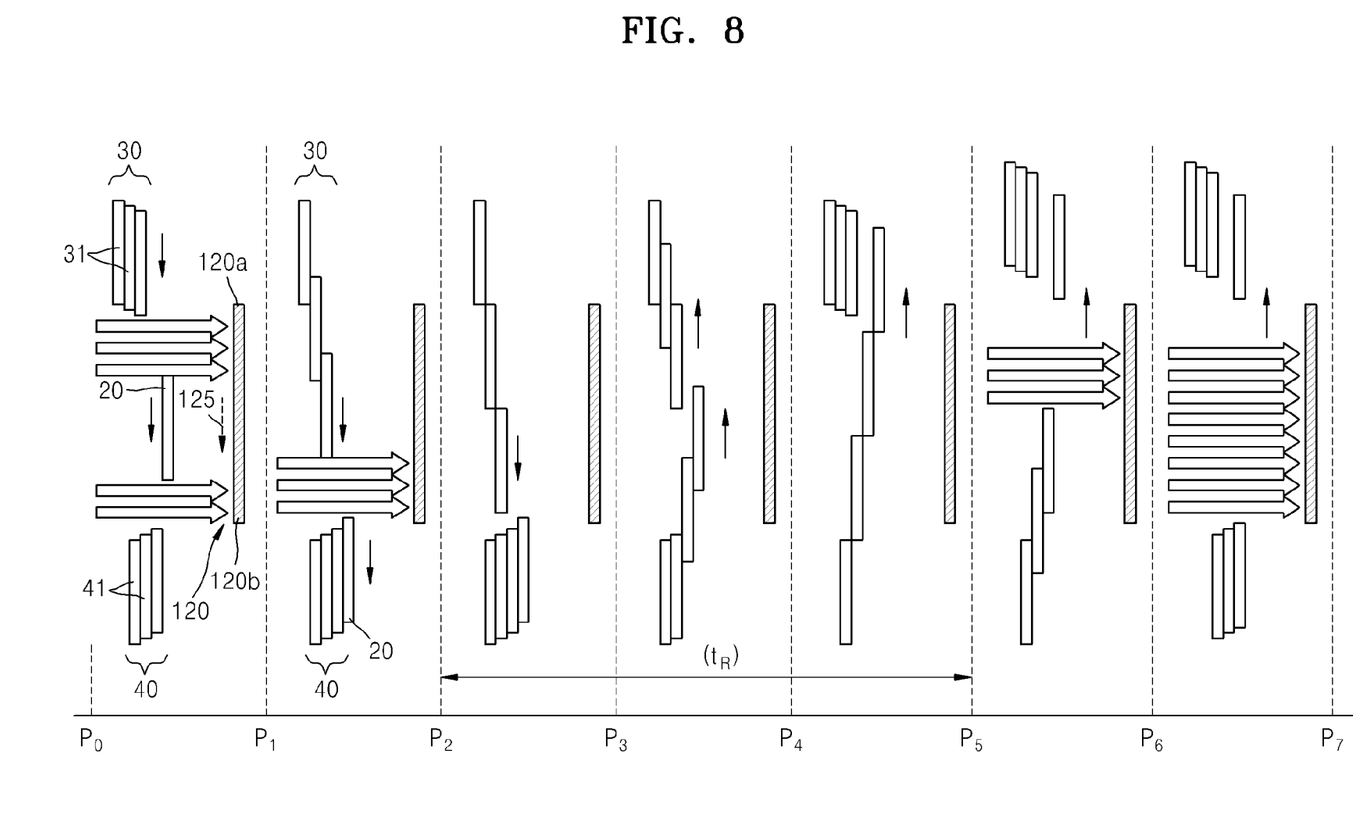
FIG. 8 sequentially illustrates operating states time-line of the focal plane shutter of the photographing apparatus of FIG. 6.

The speed d4 of the electronic front curtain 125 is designed to correspond to the position of the image capturing unit 120 in which light is blocked by the first blade 20, in consideration of a width of the first blade 20. FIG. 8 sequentially illustrates operating states time-line of the focal plane shutter 10 of the photographing apparatus of FIG. 6.

The state of the photographing apparatus illustrated in FIG. 4 is a state where both the first blade 20 and the second blade 30 move to the side edge 120a of the image capturing unit 120 and a state where the third blade 40 moves to the other side edge 120b of the image capturing unit 120. Since, in the state of the photographing apparatus of FIG. 4, light is incident on all regions of the image capturing unit 120, a live view image may be obtained using the image capturing unit 120. The live view image refers to an image of a subject that is provided to a user in real-time after being displayed on a display unit of an image capturing unit by obtaining an image of a subject to be photographed.

If the user starts image capturing by pressing a shutter button in the state of the photographing apparatus of FIG. 4, as illustrated by time points P0, P1, and P2 of FIG. 8, the first blade 20 makes the first movement in which it descends to the image capturing unit 120, and the second blade 30 makes a descending movement along with the first blade 20 while maintaining a predetermined distance between the second blade 30 and the first blade 20. The electronic front curtain 125 of the image capturing unit 120 operates in association with the first movement of the first blade 20.

At the time point $P_2$ of FIG. 8, the first blade 20 moves to the other side edge 120b of the image capturing unit 120, and the first layers 31 of the second blade 30 are unfolded to cover the image capturing unit 120. A data read operation of reading an electrical signal generated in each of the pixels of the image capturing unit 120 may be performed on the pixels of the image capturing unit 120 from the point of time $P_2$ because exposure has been performed on the image capturing unit 120. Of course, after exposure has been performed on the image capturing unit 120 before reaching the point of time $P_2$, a data read operation may already be started on portions of the image capturing unit 120 in which light is blocked by the first layers 31.

A time required for completing the data read operation of the image capturing unit 120 from the time point $P_2$ is $t_R$, which is indicated by a time period from time points $P_2$ to $P_5$ in FIG. 8.

Light incident on the image capturing unit 120 during the data read time $t_R$ has to be fully blocked. However, if the focal plane shutter does not operate during the data read time $t_R$ but operates after the data read time $t_R$ elapses, it takes time to move the first blade 20 and the second blade 30 of the focal plane shutter to their original positions, i.e., the side edge 120a of the image capturing unit 120, which causes a time delay until the next image capturing operation starts.

In the present embodiment, the first blade 20 and the second blade 30 may move to the side edge 120a of the image capturing unit 120 during the data read time $t_R$ so that the time delay of the image capturing operation does not occur.

The first blade 20 may move to the side edge 120a from the other side edge 120b of the image capturing unit 120 (second movement) during points of time P3 to P5. While the first blade 20 makes the second movement, the second blade 30 may move to the side edge 120a of the image capturing unit 120 together with the first blade 20. The first layers 31 of the second blade 30 used to cover the image capturing unit 120 are in their unfolded states. While the second blade 30 and the first blade 20 move in an upward direction of the image capturing unit 120, the first layers 31 overlap each other gradually, and the second blade 30 moves to the side edge 120a of the image capturing unit 120.

Even while the first layers 31 overlap each other gradually, the second blade 30 and the first blade 20 together block the light incident on the image capturing unit 120. That is, while the first blade 20 and the second blade 30 move to the side edge 120a of the image capturing unit 120, a region of the image capturing unit 120 corresponding to a movement path of the first blade 20 and the second blade 30 is blocked by the first blade 20 and the second blade 30.

While the first blade 20 makes the second movement, the third blade 40 may move along the first blade 20, and the light incident on the image capturing unit 120 may be blocked by the third blade 40. While the third blade 40 moves in an upward direction towards the side edge 120a of the image capturing unit 120, the second layers 41 of the third blade 40 may be gradually unfolded and may cover the image capturing unit 120. An upper edge of the third blade 40 may be maintained to overlap a part of the first blade 20, and the third blade 40 and the first blade 20 may move together to the upward direction of the image capturing unit 120.

At the time point $P_5$ when the data read time $t_R$ elapses, both the first blade 20 and the second blade 30 have moved to the side edge 120a of the image capturing unit 120. At the time point $P_5$, the third blade 40 quickly moves to the other side edge 120b of the image capturing unit 120 so that the image capturing unit 120 is in an open state, as illustrated by a time point $P_7$. Thus, the next image capturing operation may be performed without a time delay.

In the photographing apparatus having the above structure, a focal plane shutter standby operation of moving the first blade 20 and the second blade 30 to the side edge 120a of the image capturing unit 120 is performed during the data read time $t_R$. Thus, the next image capturing operation may be performed without a time delay so that a continuous shooting operation can be quickly performed.

Figure 9:
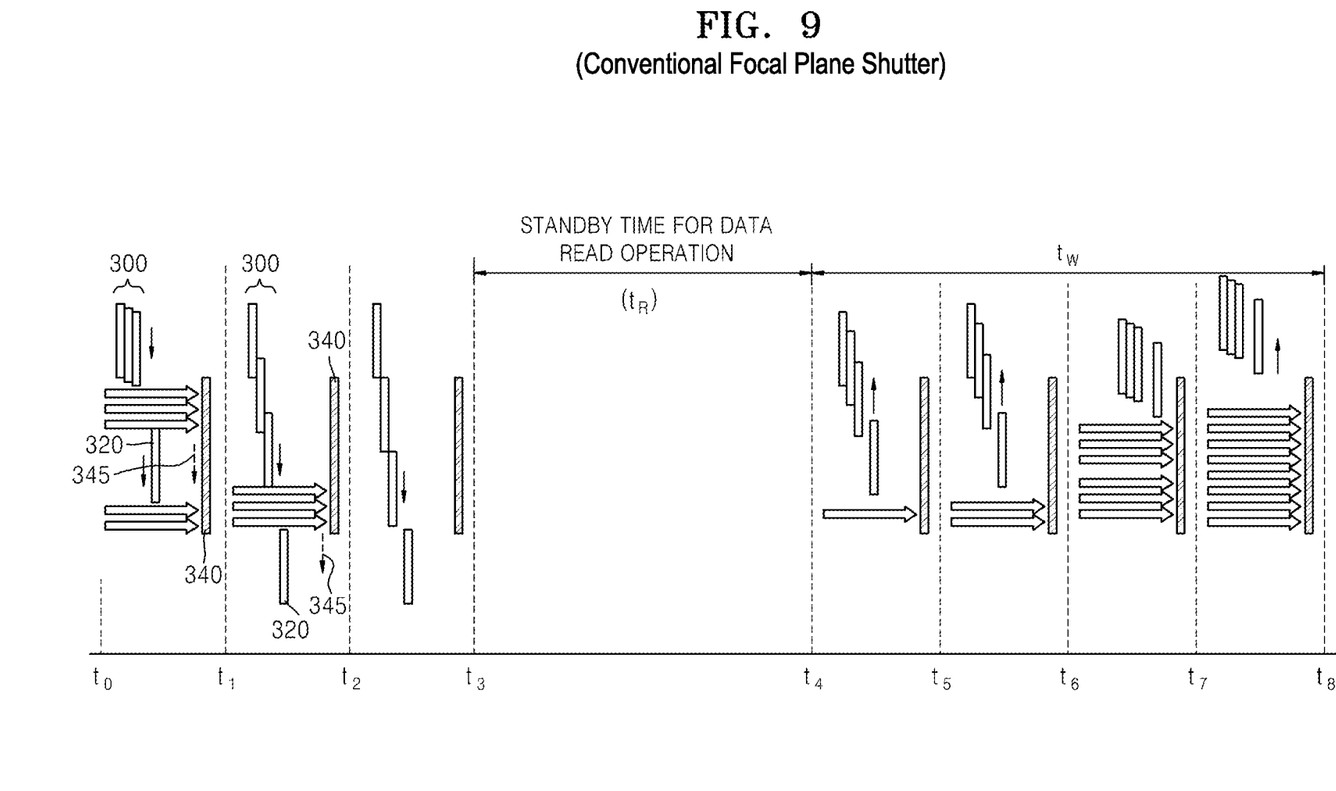
FIG. 9 sequentially illustrates a comparative example of operating states time-line of a conventional focal plane shutter having a different structure from the structure of the focal plane shutter of the photographing apparatus of FIG. 6.

FIG. 9 sequentially illustrates a comparative example of operating states time-line of a conventional focal plane shutter having a different structure from the structure of the focal plane shutter 10 of the photographing apparatus of FIG. 6.

In the comparative example of FIG. 9, a first blade 320 and a second blade 300 are disposed in front of an image capturing unit 340. While the first blade 320 and the second blade 300 move to a lower part of the image capturing unit 340, an electronic front curtain 345 of the image capturing unit 340 operates. In the comparative example of FIG. 9, a third blade is not used, unlike FIG. 8.

An exposure operation of the image capturing unit 340 is performed from time $t_0$ to time $t_3$, and a data read operation of the image capturing unit 340 is performed from time $t_3$ to time $t_4$. The data read time $t_R$ of FIG. 9 is the same as the data read time $t_R$ of FIG. 8, and the first blade 320 and the second blade 300 cannot be returned to their original positions of the image capturing unit 340 during the data read time $t_R$. While the data read operation is performed, light incident on the image capturing unit 340 has to be blocked. Thus, first blade 320 and the second blade 300 have to be maintained during the data read time $t_R$ in a state where the light is blocked by the first blade 320 and the second blade 300, as shown by the time $t_3$.

A returning operation of moving the first blade 320 and the second blade 300 to the upper edge of the image capturing unit 340 may be performed from $t_4$ to time $t_8$ after the data read time $t_R$ elapses. Since the first blade 320 and the second blade 300 are in a preparatory state at time $t_8$, the next image capturing operation may be performed after time $t_8$. In this way, $t_W$ is required as a preparatory time for the next image capturing operation. Thus, continuous shooting photographing may be severely delayed due to the effect of the delay time $t_W$ whenever continuous shooting photographing is performed.

Figure 10:
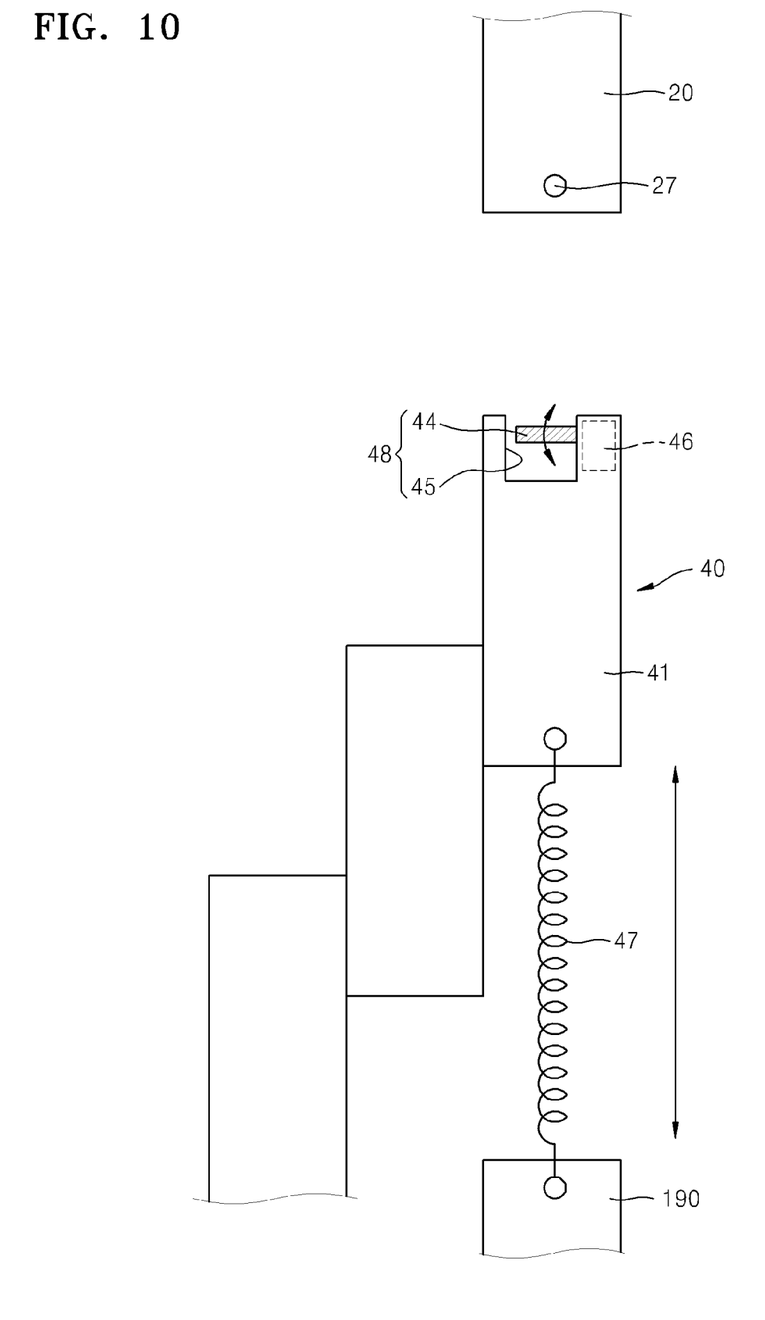
FIG. 10 is an exploded side view illustrating some elements of the focal plane shutter of the photographing apparatus of FIG. 1.

FIG. 10 is an exploded side view illustrating some elements of the focal plane shutter 10 of the photographing apparatus of FIG. 1.

When the first movement in which the first blade 20 descends is completed, the first blade 20 may make a second movement in which the first blade 20 ascends and is connected to the third blade 40.

Although a mechanical assembly for driving the first blade 20 is not shown, a second movement, in which the third blade 40 also ascends by a driving force that is generated by the first blade 20, may be made by using the mechanical assembly (not shown) that acts on the first blade 20. Alternatively, by modifying the present embodiment, the mechanical assembly (not shown) drives the third blade 40 so that the third blade 40 may make an ascending movement by pushing the first blade 20.

The third blade 40 is elastically connected to a main body 190 of the photographing apparatus 100 by using an elastic member 47. In FIG. 10, the elastic member 47 is implemented as a compressive spring. However, the present embodiment is not limited to this configuration, and the elastic member 47 may be another configuration, such as an elastic rubber, an air cylinder, or a magnetic member that includes a magnetic substance and applies a magnetic force to the third blade 40.

The elastic member 47 presses the third blade 30 in a direction of the main body 190 by elastically connecting the third blade 40 and the main body 190. When the third blade 40 is in a state where the second layers 41 are unfolded, as illustrated in FIG. 10, the third blade 40 may quickly descend due to action of the elastic member 47 and may be returned to its original position in which the second layers 41 overlap each other.

The first blade 20 includes a connection portion 27 for connecting the first blade 20 and the third blade 40. The connection portion 27 connects the first blade 20 and the third blade 40 when the first blade 20 completes the first movement in which the first blade 20 descends.

The third blade 40 includes a support portion 48 for supporting the connection portion 27 of the first blade 20. The connection portion 27 of the first blade 20 may be manufactured in a form of pin that protrudes from both edges of the first blade 20 towards an outside thereof.

The support portion 48 of the third blade 40 includes an accommodation groove 45 formed in an upper edge of the third blade 40 to accommodate the connection portion 27, and a support pin 44 disposed to be movable in the accommodation groove 45 to open or close the accommodation groove 45. The support pin 44 is disposed on a top end of the accommodation groove 45. The support pin 44 is operated by a driving portion 46 and allows the connection portion 27 to pass through the accommodation groove 45 by opening the accommodation groove 45 or supports the connection portion 27 inserted in the accommodation groove 45 by closing the accommodation groove 45.

The support pin 44 may be rotatably disposed in the accommodation groove 45. The driving portion 46 may be implemented as a motor for generating a rotational force for rotating the support pin 44. The present embodiment is not limited to the configuration of the support pin 44, and the support pin 44 may be pressurized in one direction by using an electromagnet or a spring.

When the first blade 20 descends and reaches the position of the third blade 40, the connection portion 27 of the first blade 20 and the third blade 40 are combined with each other so that the first blade 20 and the third blade 40 are connected to each other. When the first blade 20 makes an ascending movement, the third blade 40 and the first blade 20 make the ascending movement, and the second layers 41 of the third blade 40 are unfolded. Thus, while the first blade 20 and the third blade 40 make the ascending movement, light may be blocked by the first blade 20 and the third blade 40.

When the first blade 20 and the third blade 40 complete the ascending movement, both the first blade 20 and the second layers 41 of the third blade 40 are unfolded. Thus, while the data read operation of an image capturing unit (not shown) is performed, the third blade 40 may block light incident on the image capturing unit (not shown).

When the data read operation of the image capturing unit is completed, the support pin 44 is operated by the driving portion 46 so that the connection portion 27 of the first blade 20 is separated from the accommodation groove 45, and the first blade 20 and the third blade 40 are separated from each other. Since the third blade 40 is pulled in the direction of the main body 190 by using the elastic member 47, the third blade 40 may descend quickly due to the elasticity of the elastic member 47 and gravity, and the third blade 40 may be returned to its original position in which the second layers 41 of the third blade 40 overlap each other.

Figure 11:
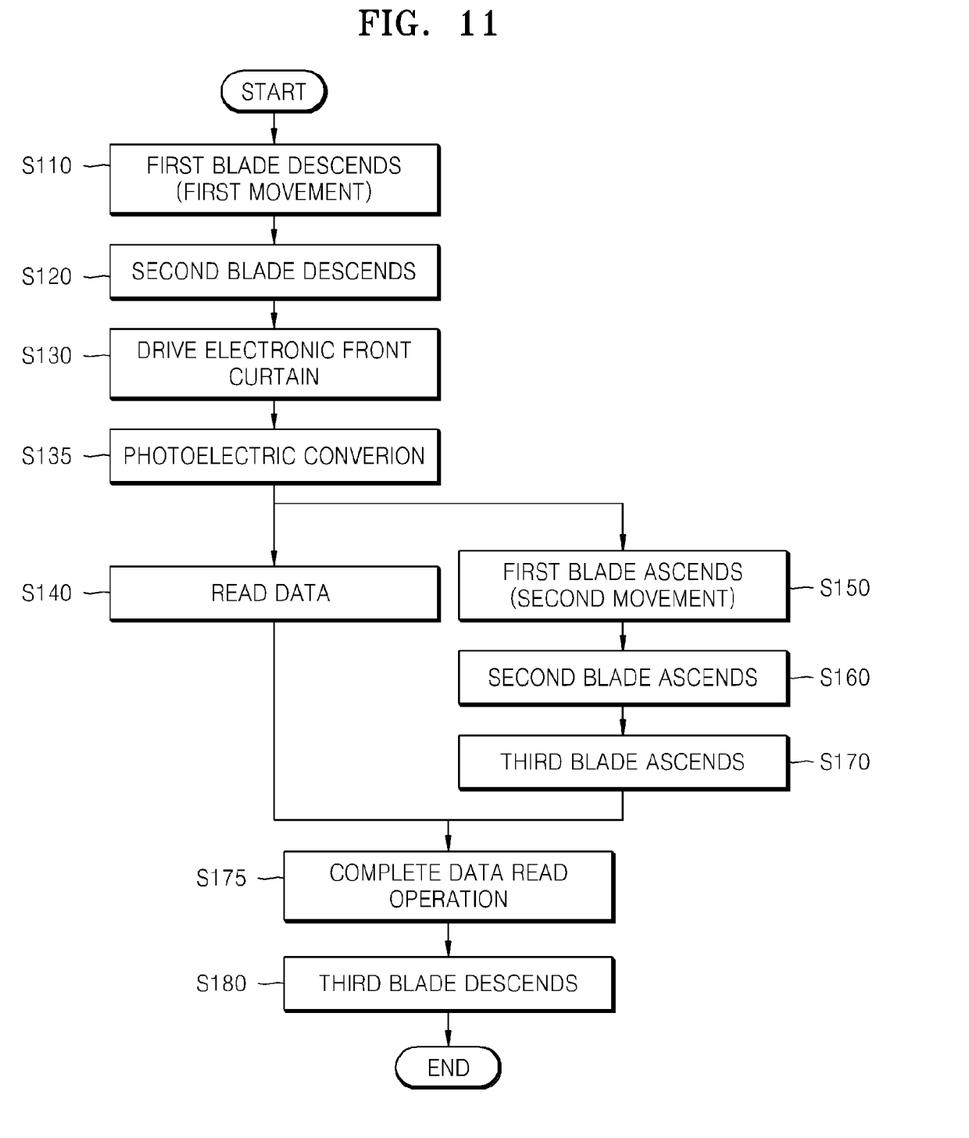
FIG. 11 is a flowchart illustrating operations of a photographing method performed by using the photographing apparatus of FIG. 1, according to an embodiment.

FIG. 11 is a flowchart illustrating operations of a photographing method performed by using the photographing apparatus of FIG. 1, according to an embodiment.

Referring to FIG. 11, the photographing method according to the present embodiment may include: making a first blade descend (S110; first movement); making a second blade descend along with the first blade while maintaining a state where the second blade is spaced apart from the first blade by a predetermined distance (S120); driving an electronic front curtain by resetting pixels arranged in rows of an image capturing unit, when the pixels are in a position of the image capturing unit corresponding to the first blade while the first blade descends (S130); converting light incident on the image capturing unit through a space between the first blade and the second blade into an electrical signal (S135); performing a data read operation of reading an electrical signal output from the pixels arranged in the rows in which light is received (S140); making the first blade ascend in progress while the data read operation (S140) is performed in all rows of the image capturing unit (S150; second movement); making the second blade ascend (S160); and making the third blade (S170) ascend. When the data read operation is completed (S175), an operation of making the third blade that covers the image capturing unit descend (S180) may be performed.

The operations of making the first blade ascend (S150), making the second blade ascend (S160), and making the third blade ascend (S170) are performed while the data read operation (S140) of the image capturing unit is performed, and the first blade, the second blade, and the third blade may move with respect to the image capturing unit while maintaining a state where light incident on the image capturing unit is blocked by the first blade, the second blade, and the third blade.

If the operation of making the third blade descend (S180) is performed, the third blade moves to a lower edge of the image capturing unit. Thus, the image capturing device is open, and light may be incident on the image capturing unit so that preparation for the next image capturing is completed.

In the photographing method according to the above-described embodiment, while the data read operation (S140) is performed in all rows of the image capturing unit, operation of ascending the first blade (S150) and operation of ascending the second blade (S160) are performed so that the first blade and the second blade may move to a preparatory position for the next image capturing operation, and the time required for a preparatory operation of the focal plane shutter for the next image capturing operation may be reduced. Thus, continuous shooting photographing in which photographing is continuously performed for a plurality of times may be quickly preformed without a time delay.

As described above, in a photographing apparatus and method according to the one or more embodiments of the invention, while a data read operation is performed on pixels arranged in all rows of an image capturing unit, a preparatory operation in which a first blade, a second blade, and a third blade cover the image capturing unit to block light and the first blade and the second blade move to an edge of the image capturing unit is performed so that a time required for preparing a focal plane shutter for next photographing may be reduced. Thus, even when continuous shooting photographing in which photographing is performed continuously for a plurality of times, a time delay caused by an operation of the focal plane shutter may be minimized.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a non-transitory computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains may easily implement functional programs, codes, and code segments for making and using the invention.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Expressions used herein, such as "including", "comprising", or the like are used to be understood as the terms for an open type conclusion part of technology.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A photographing apparatus comprising:
    an image capturing unit comprising a plurality of pixels arranged in rows and columns, wherein the image capturing unit converts light into an electrical signal;
    a first blade having a length smaller than a length in a column direction of the image capturing unit, wherein the first blade makes a first movement to move from a side edge of the image capturing unit to an other side edge of the image capturing unit, and makes a second movement to move from the other side edge of the image capturing unit to the side edge of the image capturing unit;
    a second blade that is movable between a position in which the second blade moves to the side edge of the image capturing unit and a position in which the second blade covers the image capturing unit, wherein the second blade moves along with the first blade in a state where the second blade is spaced apart from the first blade by a predetermined distance when the first blade makes the first movement, and moves to the side edge of the image capturing unit together with the first blade when the first blade makes the second movement;
    a third blade that is movable between a position in which the third blade moves to the other side edge of the image capturing unit and a position in which the third blade covers the image capturing unit, wherein the third blade blocks light incident on the image capturing unit by moving along with the first blade, and moves to the other side edge of the image capturing unit to open the image capturing unit; and
    a controlling unit that resets the plurality of pixels in the rows of the image capturing unit when the plurality of pixels is in a position in the image capturing unit corresponding to the first blade while the first blade makes the first movement.

2. The photographing apparatus of claim 1, wherein the second blade comprises a plurality of first layers that overlap each other in a position in which the second blade moves to the side edge of the image capturing unit, and the plurality of first layers of the second blade are unfolded to cover the image capturing unit while the second blade moves to the position in which the second blade covers the image capturing unit.

3. The photographing apparatus of claim 2, wherein the third blade comprises a plurality of second layers that overlap each other in a position in which the third blade moves to the other side edge of the image capturing unit, and the plurality of second layers of the third blade are unfolded to cover the image capturing unit while the third blade moves to the position in which the third blade covers the image capturing unit.

4. The photographing apparatus of claim 2, wherein, when the first blade makes the second movement, the third blade is connected to the first blade and moves together with the first blade.

5. The photographing apparatus of claim 4, further comprising an elastic member that elastically connects the third blade to a main body of the photographing apparatus.

6. The photographing apparatus of claim 5, wherein the first blade comprises a connection portion that connects to the third blade, and the third blade comprises a support portion that supports the connection portion of the first blade.

7. The photographing apparatus of claim 6, wherein the connection portion of the first blade has a pin shape and protrudes towards an outside of the first blade, and
    wherein the support portion of the third blade comprises an accommodation groove formed in the third blade to accommodate the connection portion, and a support pin disposed to be movable in the accommodation groove so that the support pin opens the accommodation groove to allow the connection portion to pass through the accommodation groove or closes the accommodation groove to support the connection portion inserted in the accommodation groove.

8. A photographing method whereby light is converted into an electrical signal by using an image capturing unit comprising a plurality of pixels arranged in rows and columns, the photographing method comprising:
    moving a first blade having a length smaller than a length in a column direction of the image capturing unit from a side edge of the image capturing unit to an other side edge of the image capturing unit;
    moving a second blade along with the first blade in a state where the second blade is spaced apart from the first blade by a predetermined distance;
    resetting the plurality of pixels in the rows of the image capturing unit when the plurality of pixels is in a position in the image capturing unit corresponding to the first blade while the first blade moves; and
    converting light incident on the image capturing unit into an electrical signal through a space between the first blade and the second blade while the first blade moves;
    reading an electrical signal output from the plurality of pixels in which light is received by the image capturing unit;
    moving the first blade and the second blade from the other side of the image capturing unit to the side edge of the image capturing unit while the electrical signal output from the plurality of pixels is read from all of the rows of the image capturing unit, after the first blade has moved to the other side edge of the image capturing unit; and
    moving a third blade disposed at the other side edge of the image capturing unit to the side edge of the image capturing unit while the first blade and the second blade move to the side edge of the image capturing unit.

9. The photographing method of claim 8, further comprising:
    after reading the electrical signal output from the plurality of pixels from all of the rows of the image capturing unit, moving the third blade to the other side edge of the image capturing unit to open the image capturing unit.

10. The photographing method of claim 9, wherein the third blade is pressed to the other side edge of the image capturing unit using an elastic member.

11. The photographing method of claim 9, wherein the second blade comprises a plurality of first layers that overlap each other in a position in which the second blade moves to the side edge of the image capturing unit, and the plurality of first layers of the second blade are unfolded to cover the image capturing unit when the second blade moves along with the first blade toward the other side edge of the image capturing unit.

12. The photographing method of claim 11, wherein the third blade comprises a plurality of second layers that overlap each other in a position in which the third blade moves to the other side edge of the image capturing unit, and the plurality of second layers of the third blade are unfolded to cover the image capturing unit when the third blade moves to the side edge of the image capturing unit.

13. The photographing method of claim 12, wherein when the third blade is moving to the side edge of the image capturing unit, the third blade is connected to the first blade and moves together with the first blade.

14. A photographing apparatus comprising:
 an image capturing unit that converts light into an electrical signal;
 a first blade that is movable between a first position corresponding to a side edge of the image capturing unit and a second position corresponding to an other side edge of the image capturing unit;
 a second blade disposed in the first position comprising a plurality of first layers that is movable to overlap or to be unfolded, wherein when the first blade moves to the second position, the second blade moves along with the first blade while maintaining a predetermined distance apart from the first blade and the plurality of first layers unfolds to cover the image capturing unit, and when the first blade moves the first position, the second blade moves together with the first blade;
 a third blade disposed in the second position comprising a plurality of second layers that is movable to overlap or to be unfolded, wherein when the first blade moves from the second position to the first position, the third blade connects to the first blade and moves together with the first blade to the first position and then moves to the second position; and
 a controlling unit that resets a plurality of pixels in rows of the image capturing unit when the plurality of pixels are in a position in the image capturing unit corresponding to the first blade while the first blade moves to the second position.

15. The photographing apparatus of claim 14, wherein,
 while the first blade moves to the second position, the image capturing unit converts light incident on the image capturing unit through a space between the first blade and the second blade to output the electrical signal, and
 while the controlling unit reads the electrical signal output from the image capturing unit, the first blade, the second blade, and the third blade move to the first position and block light, and
 after the controlling unit reads the electrical signal from all of the rows of the image capturing unit, the third blade moves to the second position.

16. The photographing apparatus of claim 15, further comprising:
 an elastic member that elastically connects the third blade to a main body of the photographing apparatus.

17. The photographing apparatus of claim 16, wherein the first blade comprises a connection portion that connects to the third blade, and the third blade comprises a support portion that supports the connection portion of the first blade.

18. The photographing apparatus of claim 17, wherein the connection portion of the first blade has a pin shape and protrudes towards an outside of the first blade, and
 wherein the support portion of the third blade comprises an accommodation groove formed in the third blade to accommodate the connection portion, and a support pin disposed to be movable in the accommodation groove so that the support pin opens the accommodation groove to allow the connection portion to pass through the accommodation groove or closes the accommodation groove to support the connection portion inserted in the accommodation groove.

19. The photographing apparatus of claim 18, further comprising:
 a driving unit that operates in response to a control signal applied by the controlling unit to drive the support pin.

20. The photographing apparatus of claim 15, further comprising:
 a magnetic member that presses the third blade towards a main body of the photographing apparatus.

* * * * *